Sept. 30, 1941.  L. B. SCOTT ET AL  2,257,655

INSECT TRAP

Filed May 17, 1941

Inventors:
L. B. SCOTT
J. MILAM
By H. N. Foss
A. J. Kramer
Attorneys

Patented Sept. 30, 1941

2,257,655

UNITED STATES PATENT OFFICE 2,257,655

INSECT TRAP

Lincoln B. Scott and Joe Milam, Clarksville, Tenn., dedicated to the free use of the People in the territory of the United States Application May 17, 1941, Serial No. 393,900

2 Claims. (Cl. 43—107)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

This invention relates to insecticide traps, and the general object is the provision of a device for trapping moths, especially moths of the tobacco worm, *Protoparce quinquemaculata* (Haw.), and the tomato worm, *Protoparce sexta* (Joh.).

In the accompanying drawing, there is illustrated an embodiment of this invention in which.

Figure 1:
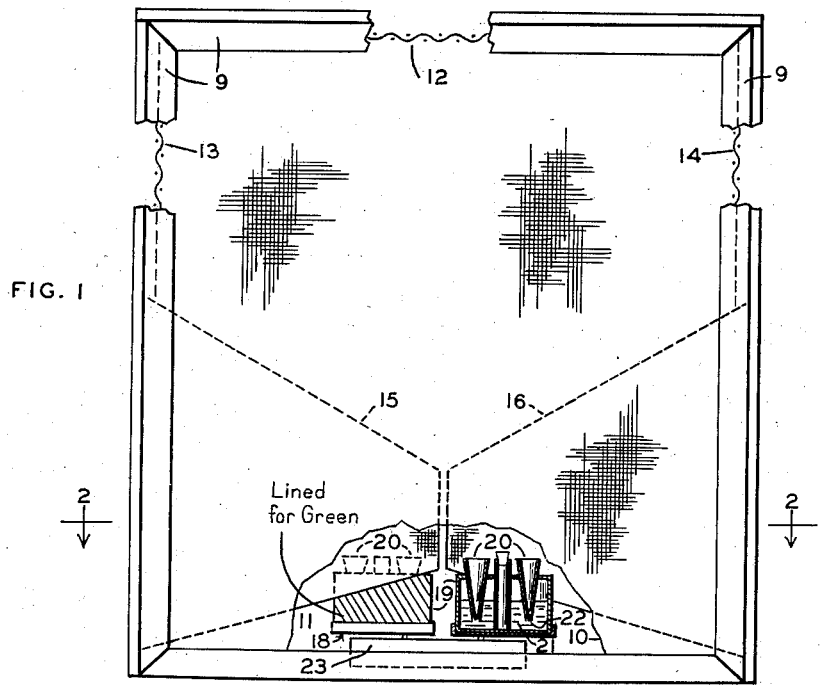
Figure 1 is a side elevational view, partly in section.
Figure 2:
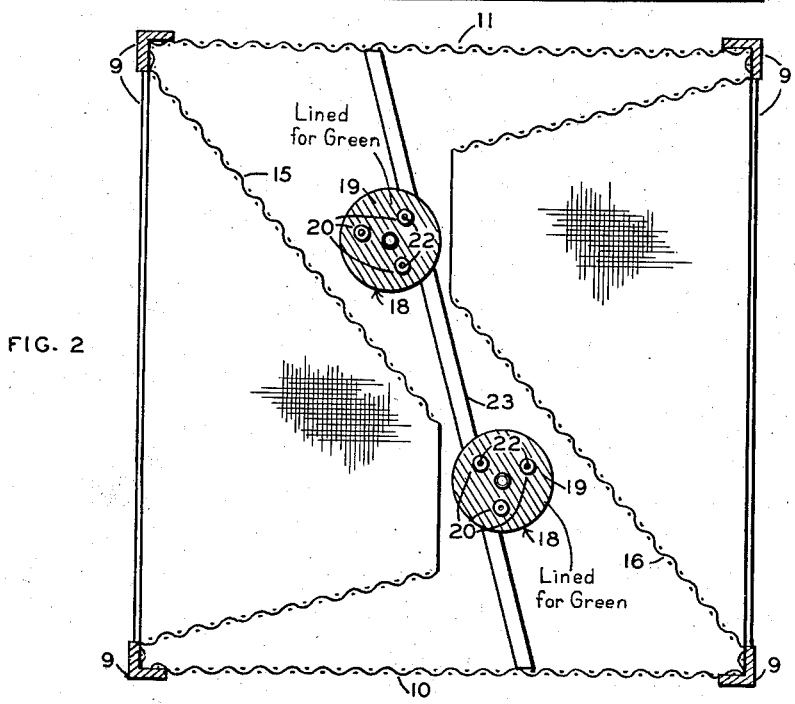
Figure 2 is a section along the line 2—2 of Figure 1.

Referring with more particularity to the drawing in which like numerals designate like parts, the embodiment illustrated comprises a screen housing having suitable frame members 9, supporting side walls 10 and 11 of screen, a screen top 12, and two end walls 13 and 14, of screen. The lower portions of these end walls 13 and 14 are each shaped in the form of funnels 15 and 16, respectively, diverging inwardly and terminating a distance about midway between the two end walls, but laterally offset from each other so that a moth entering through one of the funnels would not encounter the opening in the other funnel to effect an escape. Above the funnels 15 and 16, a space is provided to retain the moths in the housing. This space should be small enough so that moths lodged therein will not be able to control their flight within it. An area of about 30" x 35" x 12" above the funnels 15 and 16 has been found to be satisfactory for the purpose.

Within the housing, immediately in front of each of the funnel openings, there is disposed a suitable feeder unit 18. These feeder units should preferably resemble, to some extent, jimson weed in bloom. Each feeder unit consists of a reservoir 19 painted green, through the top of which white cones 20 are disposed, substantially as illustrated, with the apex of each extending downwardly into an attrahent solution 21 in the reservoir. An aperture 22 through each of the cones permits the attrahent solution to enter the cones 20, upon which the moths may feed. The reservoirs 19 are supported in position on a cross-beam 23, substantially as illustrated.

The operation of this invention is as follows: The moths are attracted to the trap from a considerable distance by the odor of the attrahent solution. When they reach the immediate vicinity of the trap, however, the response becomes partially visual on account of the feeders appearing to the moths like a cluster of jimson weed blooms. The moth enters the larger end of one of the funnels, extends his feeding tube and by means of it feels his way along the screen-wire side of the funnel toward the interior and finally reaches the small end of the funnel through which he sees the feeders clearly. After drinking from one or more of the cones 20, the moth flies directly upward, strikes the top of the trap and finally comes to rest on the inside of the top, or on one of the sides.

Having thus described our invention, we claim:

1. A moth trap comprising a screen housing having inwardly diverging screen funnels on opposite sides, terminating within the housing a distance about midway between the two sides and laterally offset, and a moth attractant within the housing adjacent the throat of each funnel, said attractant including a reservoir resembling jimson weed in bloom and an odorous attrahent solution, said housing having a space above the funnels to lodge moths, said space being of a size insufficient to permit lodged moths to gain controlled flight.

2. A moth trap comprising a screen housing having inwardly diverging screen funnels on opposite sides, terminating within the housing a distance about midway between the two sides and laterally offset, and means for supporting a moth attrahent within the housing adjacent the throat of each funnel, said housing having a space above the funnels to lodge moths, said space being of a size insufficient to permit lodged moths to gain controlled flight.

LINCOLN B. SCOTT.
JOE MILAM.